United States Patent [19]

Bird

[11] 3,909,503

[45] Sept. 30, 1975

[54] WIRING SYSTEM

[75] Inventor: Joseph W. Bird, Scituate, Mass.

[73] Assignee: Ralph Pill Electric Supply Company, Boston, Mass.

[22] Filed: Oct. 10, 1972

[21] Appl. No.: 296,287

[52] U.S. Cl. ................................................ 174/48
[51] Int. Cl.² ........................................... H02G 3/00
[58] Field of Search .............................. 174/48, 49

[56] References Cited
UNITED STATES PATENTS

| 343,087 | 6/1886 | Stieringer et al. ............... 174/49 X |
| 401,498 | 4/1889 | Johnson et al. ...................... 174/49 |
| 2,076,650 | 4/1937 | Kettron ................................ 174/49 |
| 3,601,521 | 8/1971 | Morton ................................ 174/48 |

Primary Examiner—J. V. Truhe
Assistant Examiner—D. A. Tone
Attorney, Agent, or Firm—Wolf, Greenfield & Sacks

[57] ABSTRACT

An AC power distribution system for either a commercial building or residential dwelling may be incorporated therein either during the composite construction at an assembly plant or during the erection of the dwelling or building at its final site. The system generally comprises a load center which supplies the main AC power, a preferably flat multi-wire distribution cable extending from the load center across a length of the dwelling, a plurality of distribution boxes each having power supplied thereto from the distribution cable; and a plurality of lengths of Romex, each contained in a plastic bag secured between the studs and connected to the appropriate terminals of its associated distribution box.

15 Claims, 14 Drawing Figures

U.S. Patent  Sept. 30,1975  Sheet 1 of 4  3,909,503

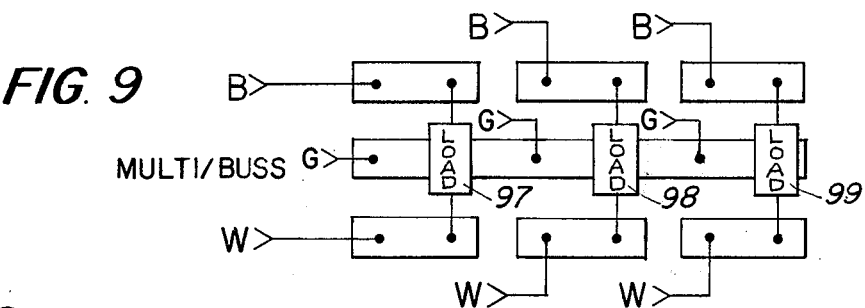
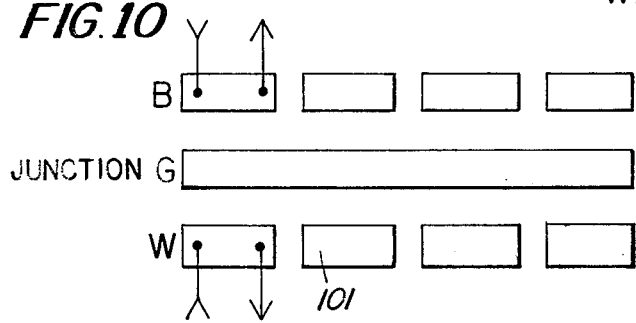
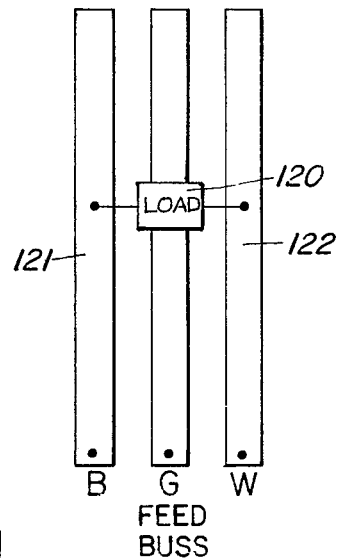
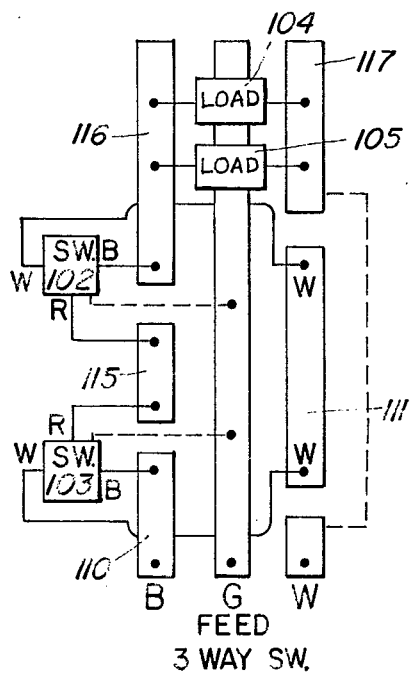
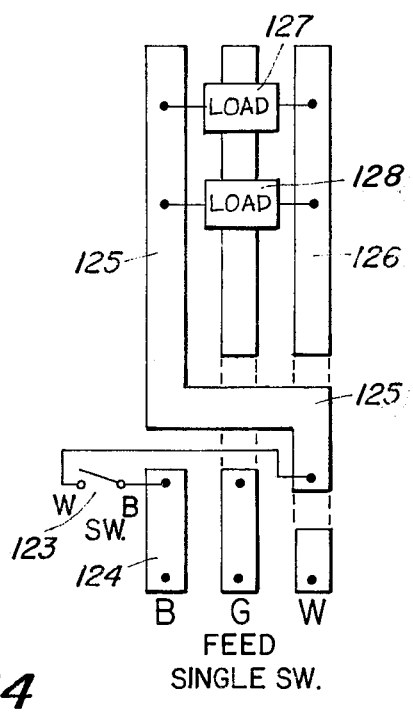
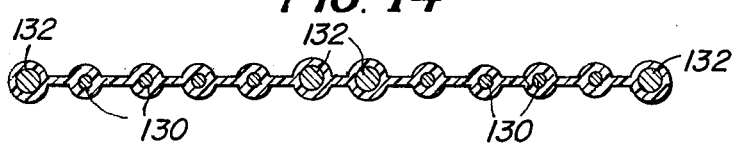

WIRING SYSTEM

FIELD OF THE INVENTION

The present invention relates in general to a power distribution system for incorporation into either a residential dwelling or commercial building. More particularly, the present invention is concerned with an AC power distribution system that may be easily and quickly installed during the construction of the building whether constructed as a composite structure or at the building site.

BACKGROUND OF THE INVENTION

The normal procedures used for installing electrical wiring in a building are relatively complex and require an excessive amount of time for installation. One method for installing wiring presently used requires the interconnecting cables that couple to a utilization outlet to run generally horizontally through apertures provided in the studded walls of the building. This method requires an excessive number of man-hours for installation. Also, the wiring and construction cannot always take place concurrently, thus causing construction delays.

Other drawbacks associated with this known system, in addition to the cost and time of installation, include the requirement for a trained person to install the wiring and the need for periodic inspection before the dry wall is secured to the stud wall of the building.

Accordingly, it is an object of the present invention to provide an improved power distribution system for incorporation into a building during the construction of the building.

A further object of the present invention is to provide an AC power distribution system in accordance with the preceding object that may be installed quickly, at a relatively low labor cost and at a relatively low overall cost.

Another object of the present invention is to provide an AC power distribution system for a building that is not excessively complex and that can be installed even by semi-skilled persons.

Still a further object of the present invention is to provide an AC power distribution system in accordance with the preceding objects and that is relatively easy to inspect and can in fact be inspected even after the layout of the wiring is completed and the dry wall has been secured to the stud walls.

SUMMARY OF THE INVENTION

To accomplish the foregoing and other objects of the present invention there is provided a power distribution system for installation in a building or a dwelling. This system may be installed either during the construction of the building at its final building site or when the building is being constructed in sections or halves at a factory. The system generally comprises a load center having AC power coupled thereto and a multi-wire cable coupled to the load center and extending along a predetermined length of the building. In many buildings that are now constructed they are constructed in two elongated segments which are joined at the building site. For these types of construction there is preferably used two multi-wire cables, one for servicing each of the halves of the building. The system further comprises distribution boxes including a connector board having one or more terminals for receiving power from the multi-wire cable, and a plurality of lengths of interconnecting cables each of which are contained in a retaining plastic bag coupled between the studs of the dwelling at preselected positions. The distribution box has other terminals for connecting to the interconnecting cables which have a utilization outlet connected at the other end thereof. This utilization outlet may be an AC duplex outlet or a one-way or three-way switch, for example.

BRIEF DESCRIPTION OF THE DRAWINGS

Numerous other objects, features and advantages of the invention should now become apparent upon a reading of the following detailed description taken in conjunction with the accompanying drawings in which:

FIG. 9 is a schematic, partially structural diagram of a terminal board for a multiple buss;

FIG. 10 is a schematic, partially structural diagram of a junction terminal board;

FIG. 11 is a schematic, partially structural diagram of a terminal board for a three-way switch;

FIG. 12 is a schematic, partially structural diagram of a terminal board for a single buss;

FIG. 13 is a schematic, partially structural diagram of a terminal board for a single switch; and FIG. 14 is a cross-sectional view of an alternate embodiment of the multi-wire cable shown in FIGS. 1–3.

DETAILED DESCRIPTION

Figure 1:
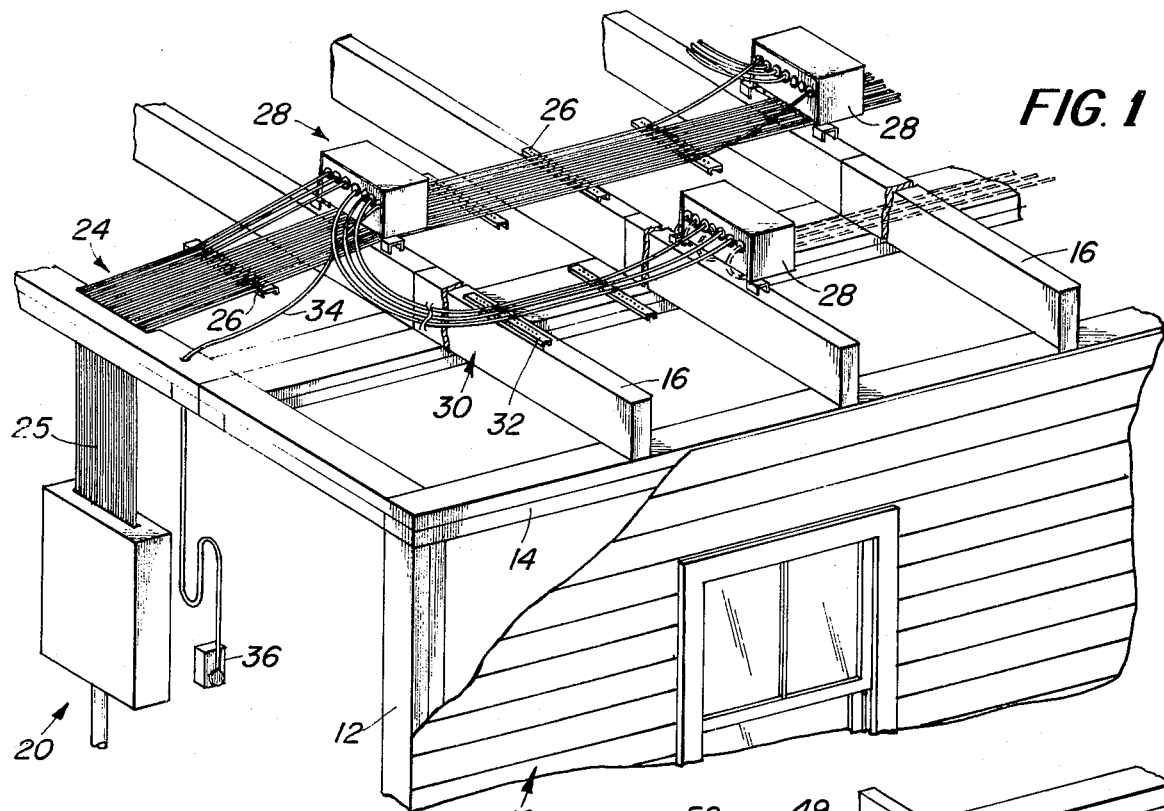
FIG. 1 is a cutaway perspective view of a building incorporating the power distribution system of the present invention.

Referring now to the drawings and in particular to FIG. 1 there is shown a perspective view of a buliding 10 that is partially cutaway to show the skeleton framework which includes studs 12, a double plate 14, and ceiling joists 16. The power distribution system of the present invention is incorporated in the structure and generally comprises a load center 20, a multiwire cable 24 and a plurality of distribution boxes 28, each of which has generally the same external appearance.

The load center 20 may be disposed secured in a wall of the building 10 or be disposed, as is the usual case in a dwelling, in the cellar. This load center may be of conventional design and has the end 25 of cable 24 coupled thereto. The end 25 of the cable may be conventionally connected to circuit breakers disposed in load center 20.

A plurality of retaining battens 26 are disposed at 12 inch intervals in the embodiment of FIG. 1. These battens secure the cable together and are also used for securing the cable to the top surface of the joists 16. If a 12 inch on-center dimension is used between the ceiling joists then all of the retaining battens 26 are used.

FIG. 1 also shows a second multi-wire cable 30 coupled from one of the distribution boxes 28. This multi-wire cable runs substantially parallel to cable 24 and is secured to the ceiling joists by means of retaining battens 32 which are similar to or identical to the battens 26.

FIG. 1 shows one of the distrubution boxes 28 which is closest to the load center 20 as illustratively having an interconnecting cable 34 which may be a three-wire Romex cable coupled to an outlet 36 which may be a duplex outlet secured to a stud (not shown) of the framework. In FIG. 1 the interconnecting cable 34 has already been secured in distribution box 28. The distribution box 28 shall be discussed in more detail hereinafter with reference to FIG. 3.

FIG. 1 also shows that some of the wires of cable 24 couple to the distribution box but that the plurality of them extend lengthwise of the building to other distribution boxes disposed therealong. Also, in the distribution box that is closest to the load center there is provided a plurality of interconnections that form cable 30 for connection to the intermediate distribution box 28 shown in FIG. 1.

Figure 2:
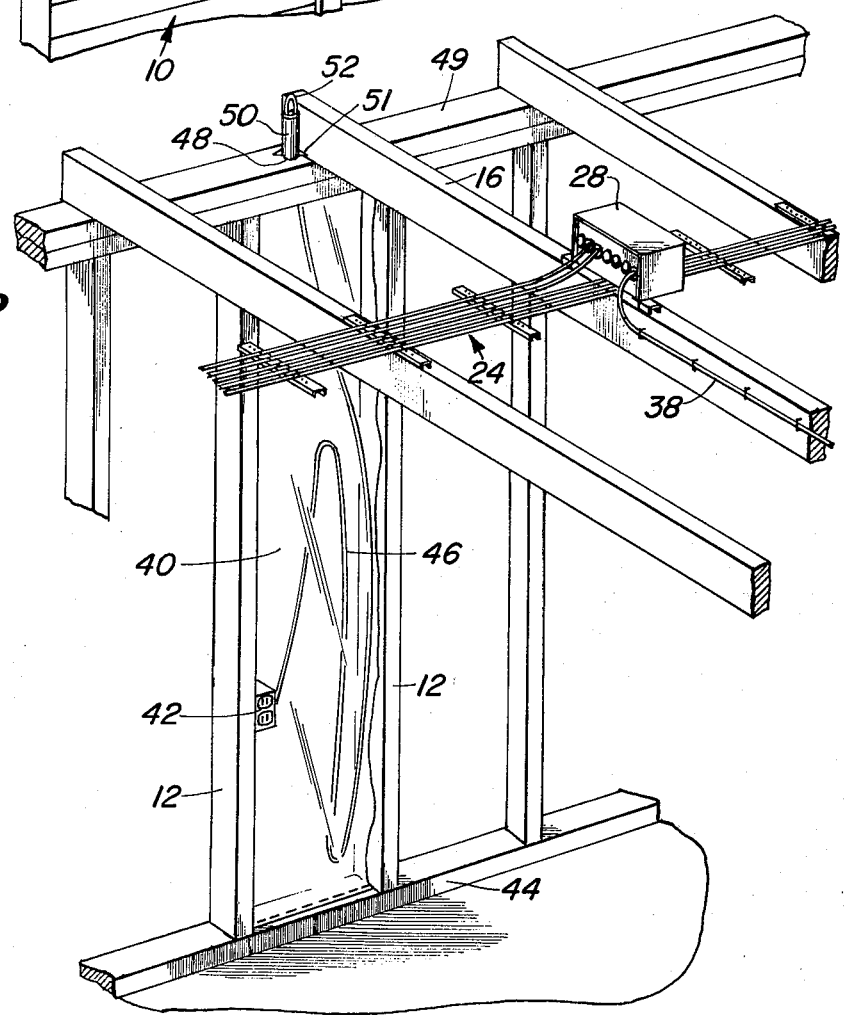
FIG. 2 is a fragmentary perspective view of a section of the building of FIG. 1 showing the plastic retaining bag secured between the studs of the building, the multi-wire cable, and a distribution box.

Referring now to FIG. 2 there is shown one of the distribution boxes 28 and multi-wire cable 24 secured in a similar manner, as discussed with reference to FIG. 1, to the ceiling joists. This arrangement shows at least one of the wires of multiwire cable 24 being coupled to box 28. An interconnecting Romex wire 38 has been coupled from a utilization load (not shown) to terminal box 28.

In accordance with this invention, each of the utilization outlets is contained within a plastic retaining bag shown in FIG. 2 as bag 40. After the stud wall has been fabricated the plastic bag 40 is secured between studs 12. The duplex outlet 42 shown in FIG. 2 is secured within the bag at a suitable height above the sole 44. Outlet 42 may be secured in any suitable manner within the bag and once the bag is inserted between the studs can be retained against one of these studs in a secured position. After the bag has been secured in place, the whip 46 of interconnecting wire which is conventionally coupled at one end to outlet 42 may be pulled through an aperture 48 in top plate 49 and retained in place by means of retaining tube 50. The end 52 of whip 46 is bent back on itself and has the wires stripped for ease of connection to the distribution box 28. The retaining tube 50 has a plurality of wings 51 which may be extended outwardly for preventing the tube 50 from falling through the aperture 48. When this outlet is to be connected to the distribution box the installer simply pulls the end 52 up through the aperture and over to the distribution box 28. Staples or the like may be provided for securing the wire to the side of a ceiling joist, if necessary. The retaining tube 50 is appropriately marked so that after the wall panel is inserted over the studs one can easily identify the particular outlet that it is associated with. Also, the terminal box 28 contains a preselected terminal board, as discussed hereinafter with reference to other figures, so that the outlet is appropriately interconnected into the system.

The plastic bag 40 may be a .004 mil, 14 × 100 plastic bag and the duplex outlet 42 shown may be secured in the bag at a typical height of approximately 16 ½ above the sole 44. The interconnecting Romex whip 46 may be approximately 24 in length and is folded, as shown, in a manner to allow the stored wire to be easily withdrawn by way of the aperture 48 shown in FIG. 2.

Figure 3:
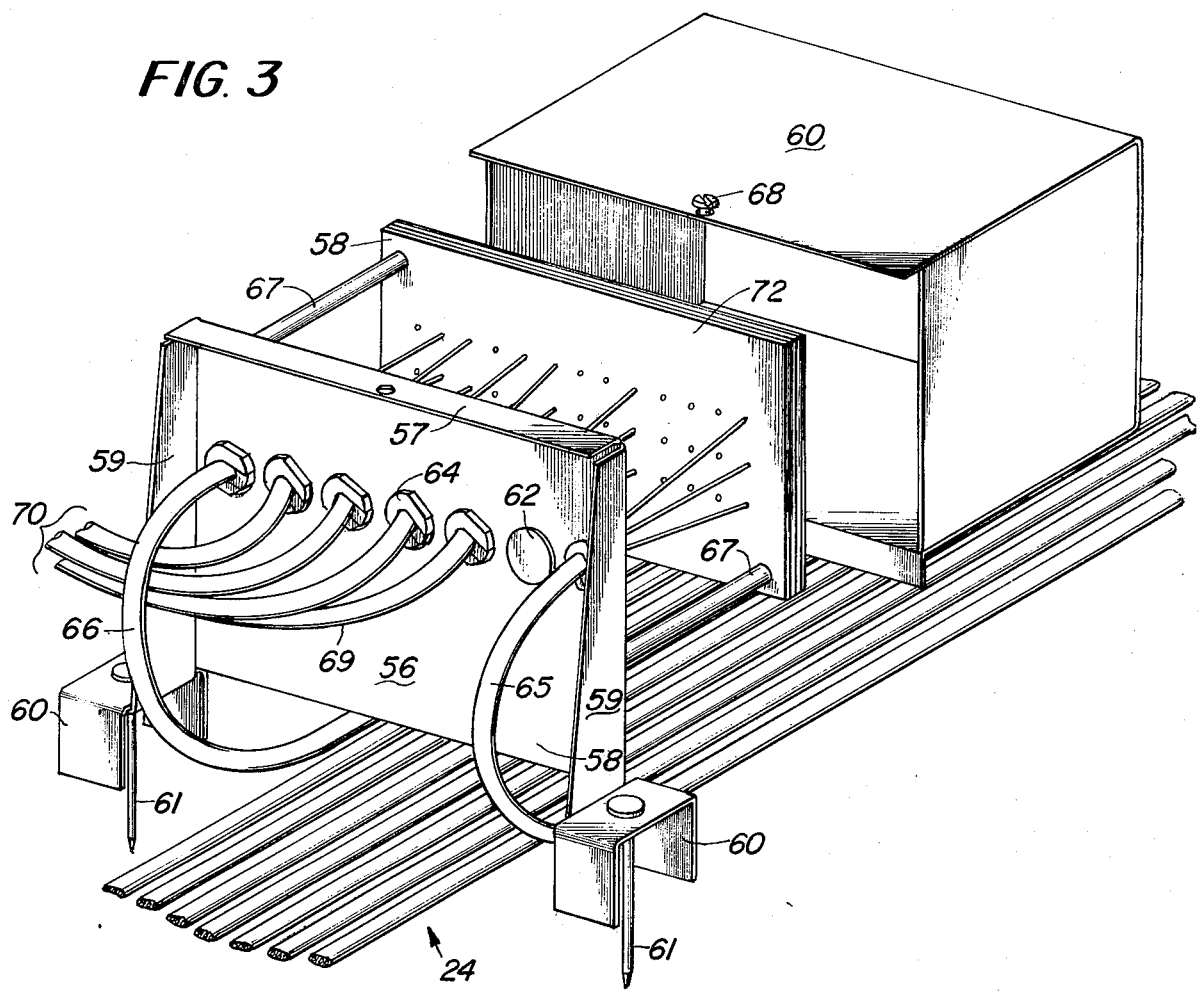
FIG. 3 is an exploded perspective view of one of the distribution boxes shown in FIGS. 1 or 2 disposed above the multiwire cable.

FIG. 3 is an exploded perspective view showing one embodiment of a typical terminal box 28 including a mounting bracket 56, terminal board 58, and cover 60. The mounting bracket 56 may be constructed of a single piece of metal having a top wall 57, vertical wall 58, side walls 59 and bridged end members 60. Each of the members 60 has an aperture for accommodating a securing nail 61 which is preferably driven into the top surface of one of the ceiling joists.

The vertical wall 58 is provided with a plurality of circular apertures 62 each of which may receive a strain relief bushing 64 which may be of conventional design. The bushing 64 is in turn adapted to hold and securely position one of the wires of multi-wire cable 24, for example. In FIG. 3 the wires 65 and 66 of cable 24 couple to the distribution box 28 by means of the strain relief bushings.

The terminal board 58 is shown in FIG. 3 as being supported by support rods 67 which may be secured at either end in a conventional manner to vertical wall 58 and two of the corners of terminal boards 58, respectively. The cover 60 may be slid over the terminal board 58 and is engageable with the top wall 57 of support bracket 56. A securing screw 68 may be used to secure the cover and support bracket in fixed relationship.

In FIG. 3 the cable 65 from multi-wire cable 24 is a three-wire cable containing the three conventional wires which are normally color-coded white (W), black (B) or green (G) to assure proper connections. Cables 65 and 66 may also be referred to as feed wires for delivering power to terminal board 58. If it is assumed that the terminal board 58 is of the type shown in FIG. 13, namely a single switch terminal board then the Romex cable 69, for example, may couple to a switch and the remaining cables of cable group 70 may couple to various loads controlled by the switch. In FIG. 3 each of the wires of Romex cable 65, for example, is shown extending to accommodate contacts of terminal board 58.

Figure 4:
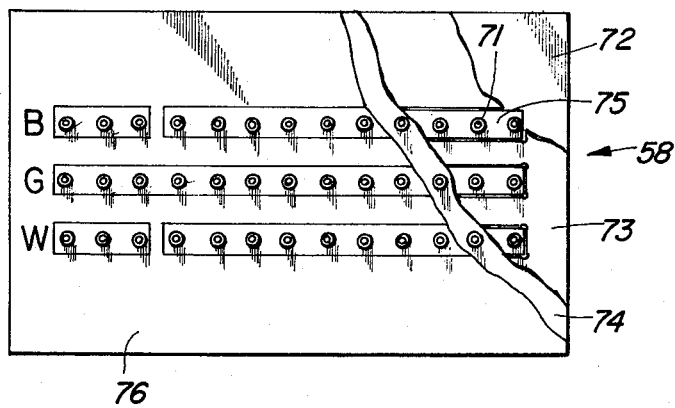
FIG. 4 is a plan view partially cutaway of a typical terminal board such as the one shown in FIG. 3.
Figure 8:
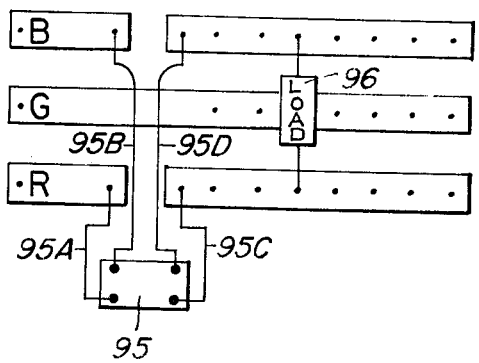
FIG. 8 is a schematic, partially structural diagram of a terminal board for a heater/thermostat.

Referring now to FIG. 4 there is shown a plan view partially cut away of a terminal board 58 which in this case is the same type shown in the partially schematic diagram of FIG. 8. The board 58 comprises three insulating boards 72, 73 and 74, boards 72 and 74 of which are provided with a plurality of apertures aligned as shown in FIG. 4. The board 72 (see also FIG. 3) has apertures which receive the ends of the wires of cable 65, for example. The intermediate board 73 is cut out as shown in FIG. 4 to receive strips 75 having post contacts 71 extending therefrom through apertures in board 74. These post contacts are hollow and each receive a wire. An outer thin paperlike cover 76 is color-coded to identify each of the strips 75. These strips are identified by the designations B, G, W and sometimes R.

The terminal board shown in FIG. 4 may be constructed with the three insulating boards 72, 73 and 74 fixed together in a suitable manner. The outer cover 76 may then be glued to board 74 in any suitable manner.

The strips 75 of which there are five in FIG. 4 of varying lengths have a plurality of post contacts associated therewith which may be secured to the strips in any suitable manner such as by soldering. The three-wire cables connecting to the terminal board have each wire crimped in one of the post contacts. The particular terminal board shown in FIG. 4 is a heater/thermostat terminal board and shall be discussed in more detail hereinafter with reference to FIG. 8.

Figure 5:
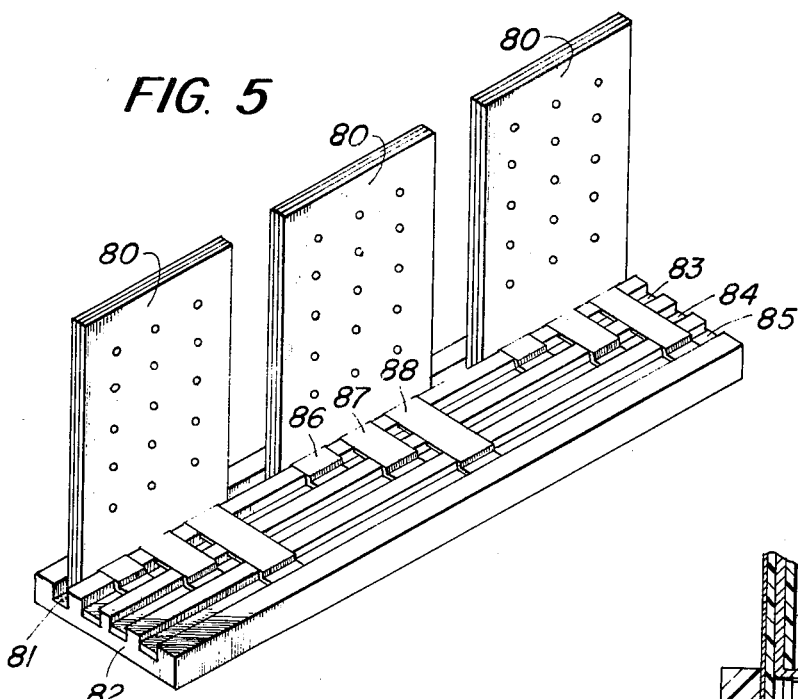
FIG. 5 is a perspective view of an alternate embodiment for the terminal board of FIG. 4.

In the embodiment shown in FIGS. 3 and 4 the terminal board 58 may be considered as providing essentially a single function. In the example as shown with reference to FIG. 3 of a single switch terminal board this switch controlled a plurality of loads but there was no other function provided other than the switching function. In an alternative embodiment of the invention shown in FIG. 5 each distribution box 28 may comprise three terminal boards 80 each of which can provide a separate function. Also, FIG. 5 shows an insulating base member 82 for receiving in an accommodating recess 81 each of the terminal boards 80. Base member 82 also includes three conductive bars 83, 84 and 85 for providing the connections between terminal boards 80 where desired. In the embodiment shown in FIG. 5 the terminal board is displaced 90° in comparison to the board of FIG. 3 with the feed preferably being at the bottom and the switch or other loads being coupled thereabove.

Figure 6:
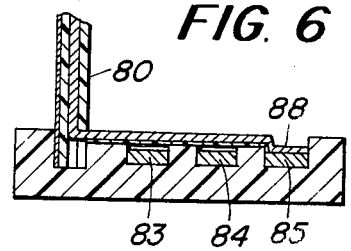
FIG. 6 is a cross-sectional view through the embodiment shown in FIG. 5.

In FIG. 5 the conductive strips which comprise each of the terminal boards 80 do not terminate as do strips 75 in FIG. 4 but are bent at their bottom ends as indicated most clearly in the cross-sectional view of FIG. 6. Each of these strips 86, 87 and 88 connect, respectively to conductive bars 83, 84 or 85. For example, the strip 86 which is the shorter strip has a downturned end that contacts bar 83 when the terminal board 80 is in position in channel 81 of the member 82. Similarly, strip 87 which is of intermediate length contacts with conductor bar 84 but is elevated above conductive bar 83. Similarly, strip 88 contacts at its end to conductor bar 85 but is spaced above conductor bars 83 and 84. In order to assure that only contact with the proper bar is made each of the strips may be insulated underneath at the area where the strip crosses the bar.

Figure 7:
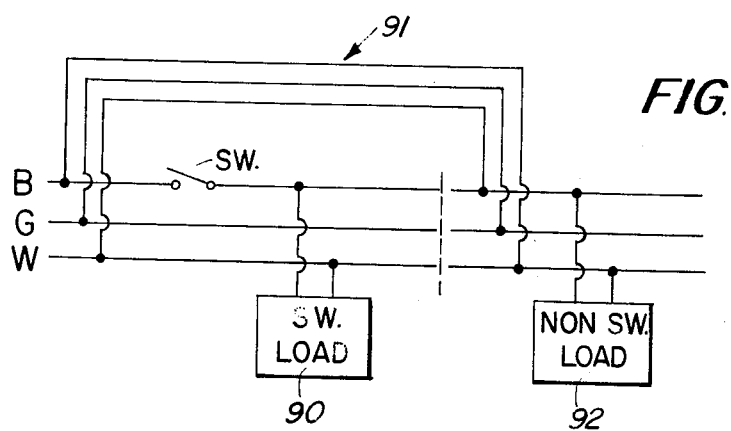
FIG. 7 is a schematic diagram illustrating a typical use that can be made of the embodiment of FIGS. 5 and 6.

FIG. 7 is a schematic diagram showing one use for the interconnecting conductor bars of FIG. 5. In FIG. 7 the vertical dash line segregate one card from the next. The leftmost card receives a power feed by way of terminals B, G and W, and contains connections to a switch SW and a switched load 90. The interconnecting lines 91 shown in FIG. 7 represent the conductor bars 83, 84 and 85 and as shown in FIG. 7 these are connected from one terminal board to the adjacent terminal board which contains a non-switched load 92. In this way it is not necessary to feed wires into both of the terminal boards but the strips 83, 84 and 85 can instead be used to couple the feed from one terminal board to an adjacent one. These interconnecting strips can also be used to intercouple other than feed lines from terminal board to terminal board.

Referring now to FIGS. 8–13, there are shown a number of different terminal boards that can be used in the system of the present invention. In each of these diagrams the entire terminal board is not shown for the purposes of clarity but only the conductor strips are shown. In addition, there is schematically shown the components that are coupled to these strips.

For example, in FIG. 8 the AC feed is to terminals B, G and R. Terminal R is used instead of terminal W because the AC feed is 240 volts rather than 120 volts. FIG. 8 also shows the heater thermostat unit 95 which has two connections 95A and 95B to the input feed and two connections 95C and 95D to the output load side of the terminal board. In FIG. 8 one load 96 is shown which is some type of a conventional heating unit which is selectively energized from the heater thermostat unit 95.

FIG. 9 shows another terminal board that has three input feeds coupled to loads 97, 98 and 99. These input feeds are 110 volts and may be three separate lines of cable 24. Each three wire cable couples to corresponding B, G and W terminals.

FIG. 10 is a junction terminal board and normally is included in the distribution box 28 of FIG. 1 closest to the load center 20. The purpose of this board is to provide a junction point between the two cables 24 and 30 shown in FIG. 1. In FIG. 10 there is shown a plurality of separate strips 101 each of which has power fed into it and out of it as indicated in FIG. 10.

In FIG. 11 there is shown a terminal board for a three way switch function which actually comprises two switches 102 and 103 either of which can be actuated to provide power to loads 104 and 105. In the board of FIG. 11 the feed is atterminals B, G and W. Switch 103 has one terminal coupled to the strip 110 and another terminal coupled to strip 111. The input terminal W is isolated from strip 111. The third terminal of switch 103 couples to a strip 115. The second switch 102 has a terminal coupled to strip 115, but has its other two terminals coupled to strip 111 and also to strip 116. The loads are coupled from strip 116 to strip 117. This arrangement provides for a three-way switch function for alternately providing power to loads 104 and 105.

FIG. 12 is a feed through buss wherein the input feed is provided to terminal B, G and W and one or more loads 120 are coupled across strips 121 and 122.

FIG. 13 at a single switch terminal board and includes a switch 123 coupled between the strips 124 and 125 and loads 127 and 128 coupled between strip 125 and strip 126. When the switch 123 is open no power can be provided to loads 127 and 128 and when the switch is closed power is coupled to these loads by way of strip 125.

One of the advantages to the system of the present invention is that it can be installed by a semi-skilled individual. Because all of the terminal boards are color-coded and also indicate where the switches and loads are to be placed it is simply a case of matching the color-coding on the wires with the color-coding as indicated on the board to properly install the switches and other various components of the system.

FIG. 14 shows a cross-sectional view for an alternate embodiment for the multi-wire cable. This cable comprises wires of two different sizes including wires 130 and 132. Wires 132 are of a heavier gauge and are usually used for the ground (G) return. The wires 130 are normally used for power feed. With the arrangement of FIG. 14 fewer total wires are used than is the case with cable 24.

What I claim is:

1. A power distribution system for a building comprising:

a load center for receiving AC power;

a multi-wire cable coupled to said load center and extending along a predetermined length of said building;

at least one distribution means including a connector board having first terminals coupled to wires of said cable;

a plurality of lengths of interconnecting cable, each contained in a retaining means connected at preselected positions in said building;

said distribution means having second terminals having one end of said interconnecting cable connected thereto;

and a utilization outlet connected to the other end of said interconnecting cable;

wherein said connector board includes a plurality of sandwiched insulating boards and a plurality of connector strips having contacts disposed therealong.

2. The system of claim 1 wherein said distribution means includes a plurality of connector boards and an insulating base member having means for receiving said plurality of connector boards.

3. The system of claim 2 comprising means for interconnecting between connector boards.

4. The system of claim 3 wherein each said connector board has its strips terminate perpendicularly of said board, each said strip being of different length, said means for interconnecting including conductor bars extending longitudinally of said base member, respective ones of said strips contacting a corresponding conductor bar.

5. The system of claim 4 wherein each said strip has a downturned flanged end.

6. A power distribution system for a building comprising:

a load center for receiving AC power;

a multi-wire cable coupled to said load center and extending along a predetermined length of said building;

at least one distribution means including a connector board having first terminals coupled to wires of said cable;

a plurality of lengths of interconnecting cable, each contained in a retaining means connected at preselected positions in said building;

said distribution means having second terminals having one end of said interconnecting cable connected thereto;

and a utilization outlet connected to the other end of said interconnecting cable;

wherein said retaining means includes a clear plastic bag for containing said length of interconnecting cable.

7. The system of claim 6 including means for securing the utilization outlet as a predetermined position within said bag.

8. The system of claim 7 wherein said length of interconnecting cable is formed in a whip within said bag.

9. The system of claim 8 wherein said bag is secured between studs of said building, said building including a plate having an aperture therein for receiving said one end of said interconnecting cable.

10. The system of claim 9 including means for preventing said one end of said interconnecting cable from falling through said aperture.

11. The system of claim 10 wherein said one end of said interconnecting cable is formed in a loop and said means for preventing includes a tube engageable with the loop and having wings for preventing the tube and loop from falling through the aperture.

12. The system of claim 6 wherein said building is prefabricated in sections, each section having a multi-wire cable associated therewith.

13. The system of claim 12 wherein one of said distribution means includes a junction connector board for interconnecting one multi-wire cable with the other.

14. A power distribution system for a building comprising:

a load center for receiving AC power;

multi-wire cable means coupled from said load center and extending to a predetermined place in the building;

distribution means at the predetermined place to which the cable means connects;

retaining means including at least one bag disposed at a preselected position in the building; a length of cable disposed in the bag and having one end extending from the bag and coupled to the distribution means;

and a utilization means connected to the other end of the length of cable.

15. The system of claim 14 wherein said bag is fixedly secured to the framework of the building.

* * * * *